INVENTORS
Camillo Bodenstein
Karl Schmid-Zeller

BY Hill, Sherman, Meroni, Gross & Simpson ATTYS.

INVENTORS
Camillo Bodenstein
Karl Schmid-Zeller

BY Hill, Sherman, Meroni, Gross & Simpson ATTYS 3,528,535

LOCKING MEANS FOR KEYBOARD TRANSMITTING SUCCESSIVE CONTROL COMMANDS

Camillo Bodenstein and Karl Schmid-Zeller, Munich, Germany, assignors to Siemens Aktiengesellschaft, Berlin and Munich, Germany, a corporation of Germany

Filed Jan. 23, 1968, Ser. No. 699,935
Claims priority, application Germany, Mar. 7, 1967, S 108,683
Int. Cl. B41j *5/22*
U.S. Cl. 197—107 4 Claims

ABSTRACT OF THE DISCLOSURE

A system for locking keys or rendering them difficult to press when one or more selected keys have already been depressed in a keyboard for transmiting successive control commands such as control pulses of the type employed as for example in teleprinters, input equipment for computers and for control key punch machines or other apparatus such as typewriters is described.

BACKGROUND OF THE INVENTION

Field of the invention

The invention relates to a means for locking or rendering certain keys of a keyboard such as used for transmitting successive control commands in a teleprinter, input equipment for computors, controls for key punch machines or other apparatus such as typewriters to prevent simultaneous transmitting of control signals which would be ambiguous.

DESCRIPTION OF THE PRIOR ART

Locking means for the keys of a keyboard have been utilized previously and have often been mechanical locking devices wherein a locking bar was actuated upon energization of a particular key. Such structures are relatively complicated and expensive and also require a relatively long time for locking and unlocking.

SUMMARY OF THE INVENTION

The present invention relates to magnetic locking sysfor a keyboard which is capable of positively locking various keys or alternatively rendering certain keys more difficult to press. The keys are mounted in a magnetic circuit such that when a key is depressed it energizes magnetic circuits in other keys so as to render them more difficult to depress or alternatively to positively lock the keys in response to the signal generated by the key. The response of the magnetic circuit is very fast and allows rapid transmittal of intelligencce. Structure is very simple and thus inexpensive to construct.

Many advantages, features and additional objects of the present invention will become manifest to those versed in the art upon making reference to the detailed description and the accompanying sheets of drawings in which preferred structural embodiments incorporating the principles of the present invention are shown by way of illustrative example.

DESCRIPTION OF THE PREFERRED EMBODIMENTS

Figures 1, 2:
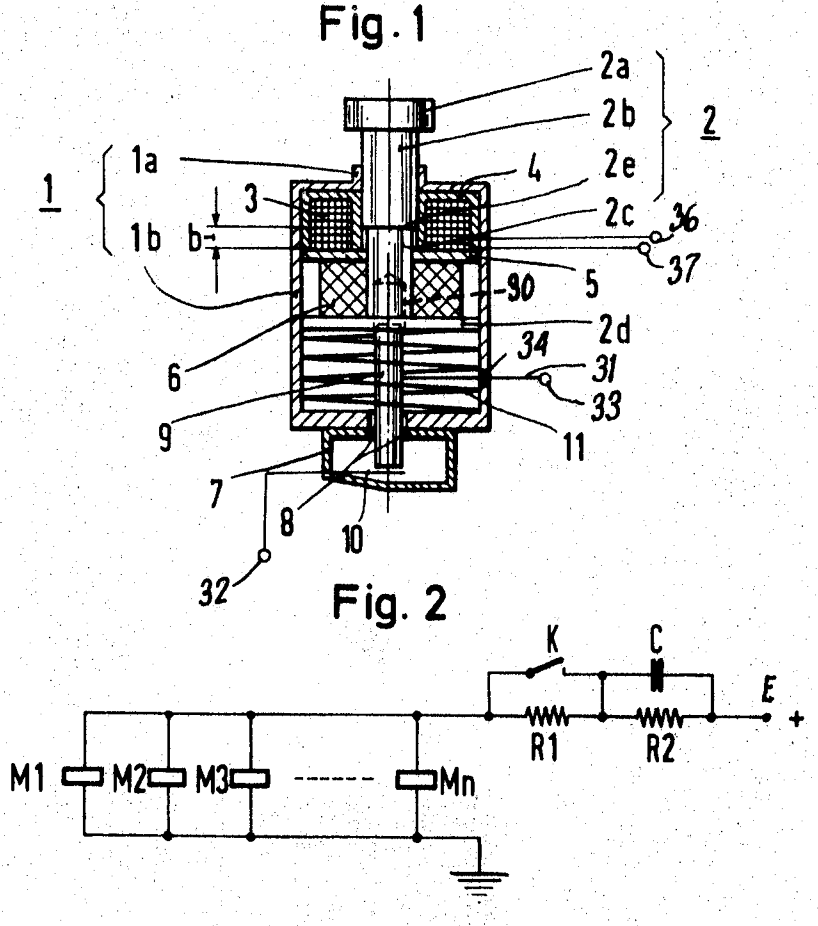
FIG. 1 is a sectional view through a key disclosing the electromagnetic arresting and locking apparatus of this invention.
FIG. 2 is a circuit diagram of arresting and locking circuits for a number of keys.

FIG. 1 illustrates a single key from a keyboard with its related arresting and locking structure. A plurality of keys such as illustrated in FIG. 1 for example may form the keyboard on an electric typewriter, a teleprinter or other apparatus for generating electrical pulses. The key 2 is supported in a housing 1 which is formed of magnetic material so as to provide a guide for magnetic flux. The key 2 comprises an engaging portion 2*a*, the main body portion 2*b* which extends through a shoulder 1*a* of the housing 1 and which is formed at its lower end with a shoulder 2*e*. A lower portion 2*c* of the key 2 extends down and carries a thin disc 2*d* which has a diameter equal to the inner diameter of the housing 1. An opening 30 is formed through the disc 2*d* and into the lower portion 2*c* to allow the key to be received over a magnetic pin 9. The pin 9 extends into switching chamber 7 which carries a switch contact 10. The pin 9 may be supported by glass sealing 8 between the pin 9 and the housing 1 and the switching chamber 7. A spring 11 is mounted between the bottom portion of the housing 1 and the disc 2*d* of the key 2 so as to bias it upwardly relative to FIG. 1. An annular permanent magnet 6 is mounted about the lower portion 2*c* of the key 2 above the disc portion 2*d*. A coil 3 and a core of an electromagnet 4 are mounted in the upper portion of the housing 1 and the key 2 extends through them. A loose adhering disc 5 is mounted between the core 4 of the electromagnet and the permanent magnet 6. The internal opening of the core is large enough to allow the portion 2*b* to move relative to the core but the shoulder 2*e* engages the disc 5 when the key is depressed.

The upper portion 2*b* of the key 2 is constructed of non-magnetic material. A flexible spring electrical contact 10 is mounted in the chamber 7 and is connected to an electrical terminal 32. When a magnetic field is applied about the pin 9 by moving the permanent magnet 6 downwardly, the flexible contact 10 is moved to engage the pin 9. A lead 31 is connected to the pin 9 and passes through an insulating opening 34 in the housing 1 and is connected to a terminal 33. A pair of leads 36 and 37 are connected to the coil 3 and extend through the housing wall 1.

The chamber 7 may contain protective gas and the glass seal 8 prevents this gas from escaping into the housing 1.

With the key 2 in the up position as shown in FIG. 1 the spring 11 urges the disc 2*d* of the key upwardly and the magnet 6 engages the disc 5 which rest against the core 4 of the electromagnet 3. Under these conditions very little magnetic flux passes through the pin 9 and the spring contact 10 does not engage the pin 9 and the electrical circuit between the spring 10 and the pin 9 is not completed. When the key 2 is depressed the shoulder 2*e* engages the disc 5 and pushes the permanent magnet 6 and disc 2*d* down over the upper portion of the pin 9. The pin enters the opening 30 under these conditions. When this occurs the permanent magnet 6 produces sufficient magnetic field in the pin 9 to cause the pin 9 to draw the spring contact 10 into engagement with the pin 9. The shoulder 2*e* pushes the disc 5 downwardly away from the core 4 when it is depressed. Thus with the key depressed electrical circuits will be completed between contacts 32 and 33 through the spring contact 10, the pin 9 and lead 31.

When the key 2 is released the spring 11 will bias it to the up position as shown in FIG. 1 and the magnet 6 will move upwardly against the disc 5 to the position shown in FIG. 1. Under these conditions the magnetic field in pin 9 will be substantially decreased and the spring contact 10 will move out of engagement with the pin 9 thus opening the circuit between contacts 32 and 33.

The holding force of the permanent magnet depends on the size of the magnet and on the amount of magnetization. These two factors can be adjusted along with the tension of the spring 11 to control the key pressure and allow it to be varied. The electromagnet 3 and core 4 allow other keys which are not being depressed to be arrested or locked depending upon the strength of the field in the magnet 3.

FIG. 2 for example illustrates an arrangement wherein the switch comprising the spring 10 and pin 9 is indicated by the switch K connected in parallel with an impedance $R_1$. A condenser C is connected across a resistor $R_2$, and the combination is in series with the switch K and the resistor $R_1$. The resistor $R_2$ and capacitor C are connected to the terminal of a voltage source E. The coils 3 of a plurality of keys similar to that shown in FIG. 1 are designated as $M_1$ through $M_n$. These are mounted in parallel with one side connected to ground and the other side connected to the switch K and impedance $R_1$. When the switch K is closed by depressing one of the switches 2 so that spring contact 10 engages the pin 9, the DC current from the source E will be connected to all of the windings $M_1$ through $M_n$. The switch K shorts out the impedance $R_1$. Thus the exciting current through the holding magnets $M_1$ through $M_n$ will be substantially increased over the open switch condition and additionally, the condenser C will discharge through the switch K so that the initial holding force of the keys will be substantially increased.

Figure 3:
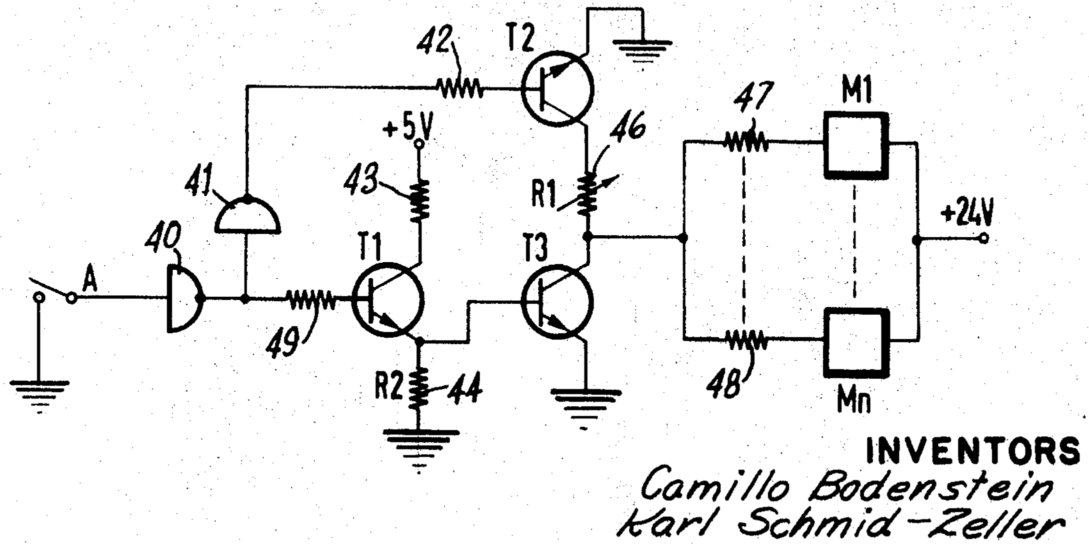
FIG. 3 is a circuit diagram of an electronic arresting and locking circuit.

If it is desired to generate a current with a locking effect the circuit of FIG. 3 may be utilized. In FIG. 3 a switch A which could for example comprise the spring contact 10 and the pin 9, has one terminal connected to ground and switch is normally opened. When the spuring contact 10 engages the pin 9 the switch A is closed.

When this occurs the input to amplifier 40 is connected to ground. The output of amplifier 40 is connected to an impedance 49 which has its output connected to the base of a transistor $T_1$. The emitter of transistor $T_1$ is connected to an impedance 44 which has its other side connected to ground. The emitter of transistor $T_1$ is also connected to the base of a transistor $T_3$ which has its emitter connected to ground. A biasing voltage source is connected to an impedance 43 which has its other side connected to the collector of transistor $T_1$. An amplifier 41 is connected to the output of amplifier 40 and supplies an input to an impedance 42. The impedance 42 supplies an input to the base of transistor $T_2$. The emitter of transistor $T_2$ is connected to ground. The collector of transistor $T_2$ is connected to a variable impedance 46 which has its other side connected to the collector of transistor $T_3$. The junction point between transistor $T_3$ and impedance 46 is connected to a plurality of impedances 47 to 48 which are connected respectively in series with the holding coils $M_1$ through $M_n$ of the keys 2. The other side of the holding coils $M_1$ through $M_n$ are connected together and to a voltage source. When the switch A is open which means that none of the keys 2 have been depressed transistor $T_2$ is on and all the electromagnets $M_1$ through $M_n$ are supplied with a holding current which generates the desired pressure upon the actuation of any key 2. When an arresting criteria occurs switch A is grounded and transistor $T_2$ will be switched off and transistors $T_1$ and $T_3$ will be turned on. Under these conditions the holding current to the coils $M_1$ through $M_n$ will be substantially increased and the keys associated therewith will be locked.

Figures 4, 5, 6, 7:
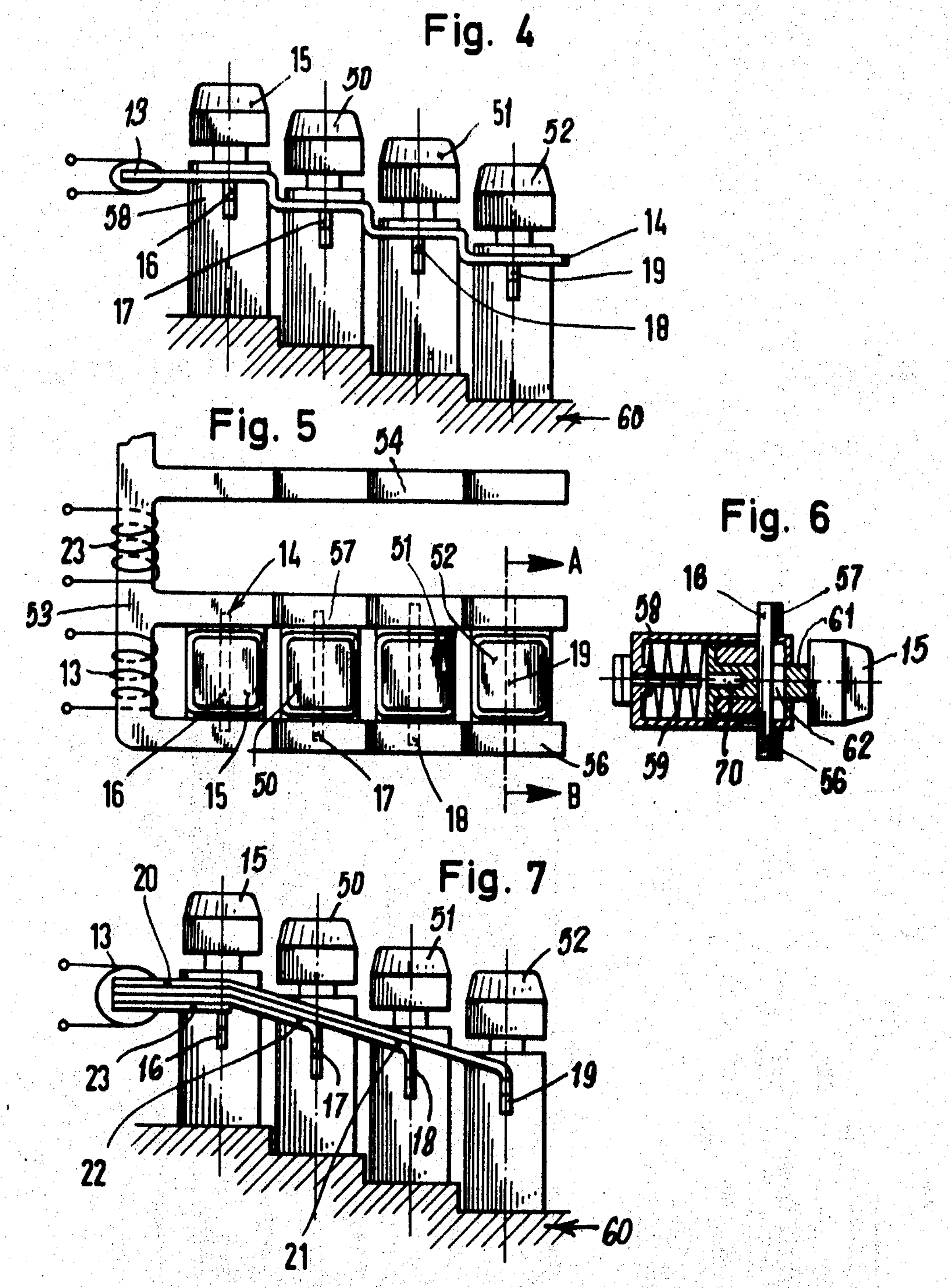
FIG. 4 is a side view of a four-row keyboard with a locking device of a modified structure.
FIG. 5 is a top view of the keyboard locking device of FIG. 4 with only one row of keys shown.
FIG. 6 is a sectional view through a key taken on line AB of FIG. 5.
FIG. 7 is a side view of a modification of the structure shown in FIG. 4.

In electronic keyboards the signal for locking the keyboard may be produced in microsecond times. The modification illustrated in FIGS. 4 to 7 allow a single holding coil to lock a plurality of keys simultaneously. In FIGS. 4, 5 and 6 a machine base 60 supports the comb-shaped member 14 which is formed with an end member 53 from which extend parallel stepped members 54, 57 and 56. A plurality of keys of which only four are illustrated between the legs 56 and 57 are mounted on the comb structure 14. Since the principles of the invention are well illustrated by illustrating four keys the remaining keys are not shown. Energizing coils 13 and 23 are mounted on the end portion 53 between adjacent legs 56 and 57 and 57 and 54, respectively. As shown in FIG. 4 the legs 56 and 57 are formed in a stair step fashion so that the keys 15, 50, 51 and 52 are arranged in descending order as is common on a keyboard. The energizing coil 13 provides a magnetizing field in the end portion 53 and in the legs 56 and 57 which are adjacent to it. Each of the keys 15, 50, 51 and 52 include cross bar magnetizing shorting members 16, 17, 18 and 19, respectively, which extend between the legs 56 and 57. The length of the magnetic cross bars 16, 17, 18 and 19 varies so that the holding power on each key is approximately equal. In other words, the key, which is closely adjacent the coil 13 is subjected to a stronger field and therefore the cross bar 16 engages the legs 56 and 57 over a smaller area than does the cross bar 19 which is relatively far removed from the holding coil 13. Thus, the cross bar 19 is longer than the cross bar 16 so that an equal holding force will be generated.

FIG. 6 is a sectional view taken on line AB of FIG. 5 and illustrates the key supporting structure and the cross bar 16 and holding legs 56 and 57. A housing 58 extends generally downwardly below the holding bar 16 and cross members 56 and 57 and includes a spring 59 which bears against a lower portion 70 of the key 15. A slot 62 is formed through the key 15 and a shoulder portion 61 engages the cross bar when the key 15 is depressed to move the cross bar 60 from engagement with the members 56 and 57. The switch may also be associated with each of the keys so that when a particular key is depressed it energizes the holding coils 13 to 23 so that the remaining keys will be subjected to a holding force.

FIG. 7 illustrates a further modification of the invention in which the keys 15, 50, 51 and 52 are mounted on laminated magnetic structure. For example the first key 15 has its magnetic cross bar 16 in contact with a relatively short magnetic yoke 24. A second layer 22 of the magnetic yoke extends to engage the cross bar 17 of the key 50. A third yoke 21 extends to the key 51 and engages the cross bar 18 of that key. A fourth yoke 20 extends to the key 52 and engages the cross bar 19 of that key. The energizing coil 13 of course passes around all of the yokes 24, 22, 21 and 20. It is to be realized of course that the yokes extend on either side of the keys so that they engage both ends of the cross bars as occurred in the modification shown in FIG. 5.

In operation it is seen that means are provided for applying a magnetic holding force to those keys which are not depressed. The holding force may be such as to lock the keys not energized so that they cannot be moved or it may be an inhibit force so as to indicate to the operator that another key has been depressed. The response of the locking and inhibiting means is very rapid and allows rapid energization of succeeding keys.

We claim as our invention:

1. A locking means for a keyboard having a plurality of keys comprising a comb-shaped supporting member formed with an end portion and a pair of parallel extending legs, said plurality of keys supported between said pair of legs, an energizing coil wound about said end portion of said comb-shaped supporting member, a plurality of cross bar magnetizing shorting members attached to said plurality of keys and extending between said pair of legs, and movable out of engagement with said legs when the associated key is depressed, a plurality of switches associated with said plurality of keys and moved when one of said keys is depressed, and a power supply connected in circuit with said plurality of switches and said energizing coil to inhibit motion of all keys not depressed when one of said keys is depressed.

2. A locking means according to claim 1 wherein said plurality of switches are mounted adjacent said plurality of keys and said keys having a plurality of actuating plungers which move said plurality of switches when the associated key is depressed.

3. A locking means according to claim 1 wherein said plurality of cross bar magnetizing shorting members become progressively larger as their distance from said end portion of said comb-shaped supporting member increases.

4. A locking means according to claim 1 wherein said comb-shaped supporting member comprises a laminated structure having a plurality of yokes of different sizes which have common end portions about which said energizing coil is wound, and a cross bar of each of said keys engageable with at least one of said yokes.

References Cited

UNITED STATES PATENTS

| | | | |
|---|---|---|---|
| 1,847,538 | 3/1932 | Robeson | 197—98 |
| 2,840,216 | 6/1958 | Larson et al. | 197—107 XR |
| 2,869,703 | 1/1959 | Hebel | 197—107 XR |
| 2,942,253 | 6/1960 | Pederson | 197—107 XR |
| 3,232,404 | 2/1966 | Jones | 197—107 XR |
| 3,234,664 | 2/1966 | Yaeger | 197—107 XR |
| 3,249,199 | 5/1966 | Jones | 197—98 XR |
| 3,251,962 | 5/1966 | Jones | 197—98 XR |
| 3,289,806 | 12/1966 | Manus | 197—107 XR |
| 3,311,210 | 3/1967 | Peroni | 197—98 |
| 3,363,737 | 1/1968 | Wada et al. | 197—98 |

EDGAR S. BURR, Primary Examiner

U.S. Cl. X.R.

178—17; 197—98; 235—27; 340—365